US012688209B2

(12) United States Patent
Chen et al.

(10) Patent No.: US 12,688,209 B2
(45) Date of Patent: Jul. 21, 2026

(54) SYSTEM AND METHOD FOR PROVIDING ANALYTICS AND INTELLIGENT QUESTION-ANSWERING VIA INTERACTIVE DASHBOARD

(71) Applicant: ProphetStor Data Services, Inc., Taichung (TW)

(72) Inventors: Wen-Shyen Chen, Taichung City (TW); Ming-Jye Sheu, Saratoga, CA (US); Henry Hong-Yi Tzeng, San Jose, CA (US); Sheng-Lin Wu, Taichung City (TW); Chee-Siong Lee, Taichung City (TW); Yung-Tsun Liu, Taichung City (TW)

(73) Assignee: ProphetStor Data Services, Inc., Taichung (TW)

( * ) Notice: Subject to any disclaimer, the term of this patent is extended or adjusted under 35 U.S.C. 154(b) by 329 days.

(21) Appl. No.: 18/125,817

(22) Filed: Mar. 24, 2023

(65) Prior Publication Data
US 2024/0320247 A1    Sep. 26, 2024

(51) Int. Cl.
| | |
|---|---|
| *G06F 16/3329* | (2025.01) |
| *G06F 40/40* | (2020.01) |
| *G06T 11/26* | (2026.01) |

(52) U.S. Cl.
CPC .......... *G06F 16/3329* (2019.01); *G06F 40/40* (2020.01); *G06T 11/26* (2026.01)

(58) Field of Classification Search
CPC .............................. G06F 16/3329; G06F 40/40
See application file for complete search history.

(56) References Cited

U.S. PATENT DOCUMENTS

| | | | | |
|---|---|---|---|---|
| 8,346,563 | B1 * | 1/2013 | Hjelm | G10L 15/1822 |
| | | | | 704/251 |
| 11,132,509 | B1 * | 9/2021 | Pasko | G06F 18/214 |
| 11,425,215 | B1 * | 8/2022 | Lewis | G06F 9/4881 |
| 2014/0188459 | A1 * | 7/2014 | Fink | G06F 40/30 |
| | | | | 704/9 |
| 2020/0302020 | A1 * | 9/2020 | Abu Asba | G06F 40/30 |
| 2021/0224937 | A1 * | 7/2021 | Luna | G06F 40/58 |
| 2022/0199079 | A1 * | 6/2022 | Hanson | H04L 51/02 |
| 2022/0383864 | A1 * | 12/2022 | Gruber | G10L 13/08 |
| 2023/0074406 | A1 * | 3/2023 | Baeuml | G06F 16/90332 |
| 2024/0144921 | A1 * | 5/2024 | Singh | G10L 15/1822 |
| 2024/0176958 | A1 * | 5/2024 | Raimondo | G06N 3/0455 |

(Continued)

OTHER PUBLICATIONS

TW OA from TW11320282690, mailed Mar. 20, 2024.

*Primary Examiner* — Anne L Thomas-Homescu
(74) *Attorney, Agent, or Firm* — Demian K. Jackson; Jackson IPG PLLC

(57) ABSTRACT

The present invention provides a method for providing analytics and intelligent question-answering via an interactive dashboard, which includes the following steps: receiving user input data via the interactive dashboard; identifying user intent from the user input data; converting the user intent into an application programming interface (API) of a local system for the local system to proceed; translating a response of the API into a natural language response; generating a revised interactive dashboard based on the user intent dynamically according to the response of the API; and presenting the natural language response via the revised interactive dashboard.

18 Claims, 9 Drawing Sheets

(56)                     References Cited

U.S. PATENT DOCUMENTS

| | | | |
|---|---|---|---|
| 2024/0205174 A1* | 6/2024 | Bailey ..................... | G06F 40/30 |
| 2024/0249318 A1* | 7/2024 | Spiegel ................... | H04L 51/02 |
| 2024/0265281 A1* | 8/2024 | Hart ........................ | G06F 40/58 |
| 2024/0281487 A1* | 8/2024 | Bathwal .............. | G06F 16/9558 |
| 2024/0289361 A1* | 8/2024 | Batina ................. | G06F 16/3328 |
| 2024/0289863 A1* | 8/2024 | Smith Lewis ......... | G06N 3/008 |

* cited by examiner

100

100

100

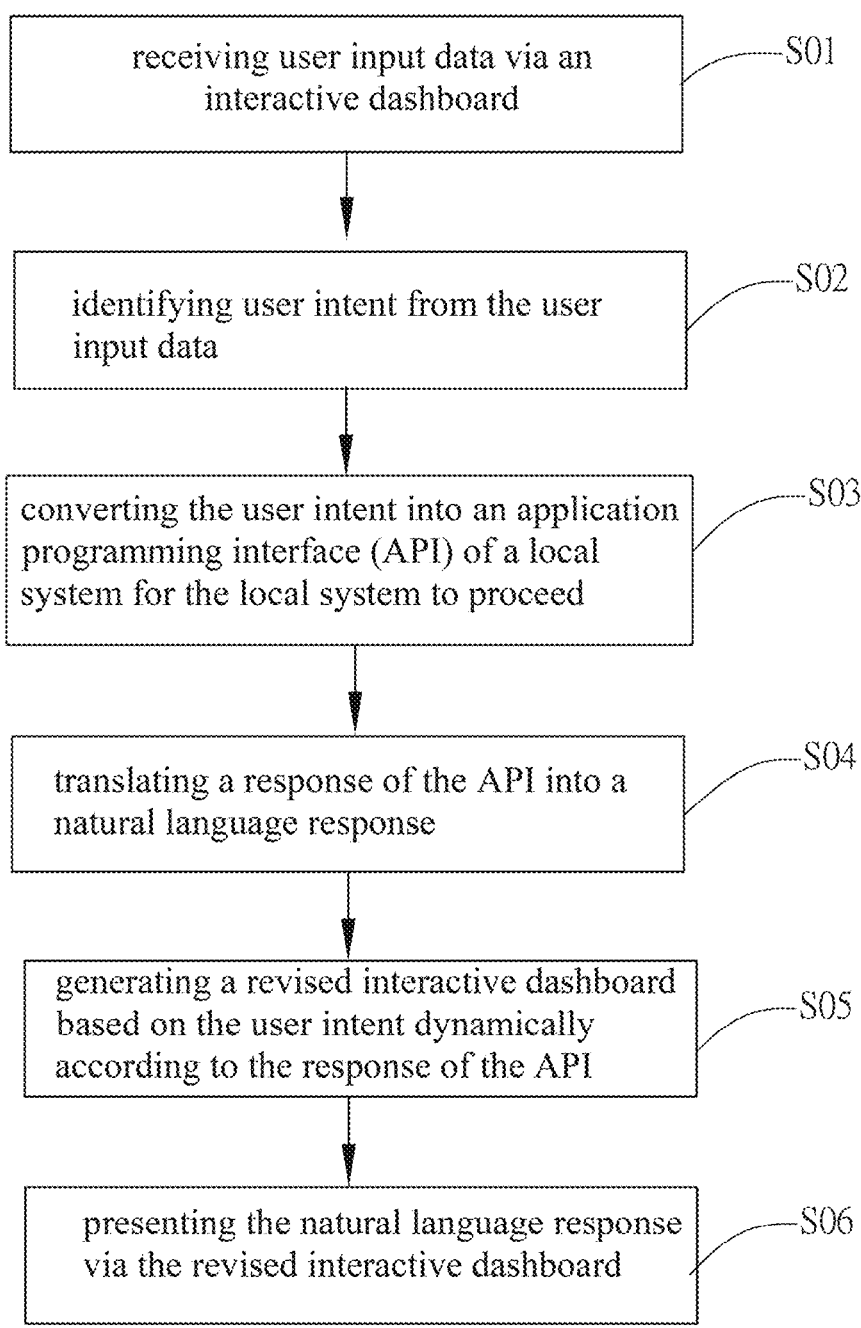

receiving user input data via an interactive dashboard ——S01 identifying user intent from the user input data ——S02 converting the user intent into an application programming interface (API) of a local system for the local system to proceed ——S03 translating a response of the API into a natural language response ——S04 generating a revised interactive dashboard based on the user intent dynamically according to the response of the API ——S05 presenting the natural language response via the revised interactive dashboard ——S06

SYSTEM AND METHOD FOR PROVIDING ANALYTICS AND INTELLIGENT QUESTION-ANSWERING VIA INTERACTIVE DASHBOARD

FIELD OF INVENTION

The present invention relates to an interactive application of a dashboard, in particular to a system and a method for providing analytics and intelligent question-answering via an interactive dashboard so as to enhance the usability and user experience of the interactive dashboard.

BACKGROUND OF THE INVENTION

Dashboards are a standard tool for presenting data and statistics visually appealingly. As shown in FIG. 1, the conventional dashboards present data and statistics visually in a one-way communication between the system and the user. Conventional dashboards are widely used in the industry and essential to various systems, such as operational and business management tools, customer relationship management systems, and online analytics platforms. However, while conventional dashboards effectively present data, they are often limited in answering questions and providing further insights. This limitation can be frustrating for users who need to understand the data presented in a conventional dashboard and want to take actionable insights from it.

The conventional approach of one-way communication from the system to the user limits the system's usability. The conventional dashboards are often designed to be functionally static presentation tools, which means users cannot interact with them to ask questions or receive further information. When the conventional dashboards cannot answer questions, the user must resort to alternative approaches, such as manual data analysis or requesting assistance from a support team. These methods can be time-consuming and often lead to a delay in the decision-making process.

The conventional dashboard is not a debugging tool if users can't ask it questions. The inability to ask questions about the systems limits the system's usability. Therefore, there is a need for a new natural language-based interactive dashboard analytics method that allows users to ask questions and receive immediate and intelligent answers from the system other than the traditional static dashboard.

In addition, the applicant found that the prior art includes various interactive dashboards and natural language processing technologies. One example is the interactive dashboard technology described in U.S. Pat. No. 11,068,649B2, which presents a user interface for interactive data analysis. This prior art provides a solution for data interaction in a dashboard-like environment. Still, it does not employ natural language processing or two-way communication between the user and the system. Another relevant prior art is the natural language processing technology described in U.S. Pat. No. 11,216,579B2, which provides a system and method for processing natural language queries. While this prior art provides a solution for processing natural language queries, it does not integrate with interactive dashboards or provide immediate and intelligent responses to user queries. Furthermore, U.S. Pat. No. 11,029,821B2 provides an interactive user interface for visually presenting data and enabling user interaction with the data. However, it does not employ natural language processing or two-way communication between the user and the system. Interactive dashboards and natural language processing have seen significant development in recent years, with various prior art references and patents in this area. However, none of these prior art references address the specific solution presented in this patent application.

SUMMARY OF THE PRESENT INVENTION

The main advantage of the present invention is to provide a system and a method for providing analytics and intelligent question-answering via an interactive dashboard, which employs ChatGPT-like Large Language Model (LLM) AI-based technology to enable two-way communication between the user and the dashboard. Furthermore, two-way communication enhances the functionality and usability of the dashboard.

Another advantage of the invention is to provide a system and a method for providing analytics and intelligent question-answering via an interactive dashboard, which allows for natural language input and immediate and intelligent responses.

Another advantage of the present invention is to provide a system and a method for providing analytics and intelligent question-answering via an interactive dashboard, which provides a novel solution for enhancing interactive dashboards' usability and user experience. In other words, the present invention provides a unique and pioneering solution with significant potential in the industry. The present invention can be applied in various industries, such as healthcare, finance, and manufacturing, and can provide significant advantages in efficiency, accuracy, and user satisfaction.

Another advantage of the invention is to provide a system and a method for providing analytics and intelligent question-answering via an interactive dashboard, which allows the user to perform planning, operation automation, optimization, resource orchestration, and debugging more interactively and efficiently.

Another advantage of the invention is to provide a system and a method for providing analytics and intelligent question-answering via an interactive dashboard, which can integrate with various existing dashboard tools and workflows, providing seamless integration with current processes.

Another advantage of the invention is to provide a system and a method for providing analytics and intelligent question-answering via an interactive dashboard, which employs natural language processing to understand user input and provide immediate and interactive revisions to the dashboard. The ChatGPT-like LLM AI-based technology enables the system to provide intelligent and accurate responses to user queries, enhancing the user experience and the dashboard's usability. The system and method can also provide what-if scenarios for the user to explore and improve the efficiency of the workflow.

Another advantage of the invention is to provide a system and a method for providing analytics and intelligent question-answering via an interactive dashboard, which seeks to solve the problem of dashboards being limited to functionally static presentation tools by providing an interactive and immersive experience for users to work with the system and the data/information presented by the system.

Another advantage of the invention is to provide a system and a method for providing analytics and intelligent question-answering via an interactive dashboard, which employs the ChatGPT-like LLM AI-based technology to enable users to interact with dashboards using natural language input and receive immediate and intelligent answers. This will enhance the usability and user experience of the system, making it genuinely real-time and interactive, according to humans, rather than machines.

Another advantage of the invention is to provide a system and a method for providing analytics and intelligent question-answering via an interactive dashboard, wherein users can ask questions about the relations of the data, the interpretation of the data, ask for anomalies of the system, or even provide some more data to query about what-if scenarios. Users can form a two-way communication with the system, rather than the conventional one-way communication with the presentation of a dashboard. This bi-directional communication can be more immersive and satisfying when using the system, allowing users to take immediate action and make decisions based on the new information provided.

Another advantage of the present invention is to provide a system and a method for providing analytics and intelligent question-answering via an interactive dashboard, which provides an interactive and immediate revision to dashboards for users to perform planning, operation automation, optimization, resource orchestration, and debugging, the invention solves the problem of traditional dashboards being limited to static presentation tools.

Another advantage of the present invention is to provide a system and a method for providing analytics and intelligent question-answering via an interactive dashboard, which employs the ChatGPT-like LLM AI-based technology; the system enables users to interact with dashboards using natural language input and receive immediate and intelligent answers. Therefore, the invention provides a pioneering solution that has significant potential in the industry.

In order to achieve the above and other objects, the present invention provides a method for providing analytics and intelligent question-answering via an interactive dashboard, comprising the following steps: receiving user input data via the interactive dashboard; identifying user intent from the user input data; converting the user intent into an application programming interface (API) of a local system for the local system to proceed; translating a response of the API into a natural language response; generating a revised interactive dashboard based on the user intent dynamically according to the response of the API; and presenting the natural language response via the revised interactive dashboard.

Preferably, the method further includes a step of repeating the steps until the user intent is satisfied.

Preferably, the method further includes a step of determining whether the user input data should be processed locally or remotely.

Preferably, the method further includes a step of determining whether the user input data is product related.

Preferably, the user intent is identified locally or remotely by a natural language processing application.

Preferably, the natural language response is translated locally or remotely by a natural language processing application.

Preferably, the interactive dashboard is connected to the local system which includes a natural language processing application, or interacts with a natural language processing application remote from the local system.

Preferably, the user input data is received via a natural language interface provided by the local system or integrated with the local system, via a voice-enabled device, or via a chatbot application.

Preferably, the revised interactive dashboard provides information to perform planning, operation automation, optimization, resource orchestration, and debugging.

Preferably, the natural language response is generated by an artificial intelligence (AI) large language model (LLM).

In order to achieve the above and other objects, the present invention also provides a system for providing analytics and intelligent question-answering via an interactive dashboard, which includes: a processing module, for processing user input data via the interactive dashboard; an identifying module, for identifying user intent from the user input data; a translating module, for translating a response from a local system into a natural language response; a dashboard generating module, for dynamically generating a revised interactive dashboard based on the user intent; and a user interface connected to the dashboard generating module, for presenting the natural language response via the revised interactive dashboard to the user.

Preferably, the system further includes a converting module, for converting the user intent into an application programming interface (API) of the local system for the local system to proceed.

Preferably, the system further includes a determining module, for determining whether the user input data should be processed locally or remotely.

Preferably, the identifying module is remotely connected to the local system.

Preferably, the translating module is a natural language processing application which is locally or remotely connected to the local system.

Preferably, the user input data is received via a natural language interface provided by the local system or integrated with the local system, via a voice-enabled device, or via a chatbot application.

Preferably, the revised interactive dashboard provides information to perform planning, operation automation, optimization, resource orchestration, and debugging.

Preferably, the natural language response is generated by an artificial intelligence (AI) large language model (LLM).

In order to make the above objects, features, and advantages of the present invention more understandable, it further provides a detailed description of the preferred embodiments, in conjunction with the accompanying drawings as follows.

BRIEF DESCRIPTION OF THE DRAWINGS

FIG. 7 is a perspective view of a method for providing analytics and intelligent question-answering via an interactive dashboard according to a second preferred embodiment of the present invention.

FIGS. 8-10 are perspective views of a sample interactive dashboard according to the present invention.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

It is understandable that the term "a" should be understood as "at least one" or "one or more". In other words, in one embodiment, the number of an element can be one and in other embodiment the number of the element can be greater than one. The term "a" is not construed as a limitation of quantity.

The following will explain the system and method for providing analytics and intelligent question-answering via an interactive dashboard. However, the embodiments of the present invention are not intended to limit the implementation of the present invention in any environment, application or method as described in the embodiments. Therefore, the description of the embodiments is only for the purpose of illustrating the present invention, rather than directly limiting the present invention. It should be noted that in the following embodiments and figures, elements not directly related to the present invention have been omitted and not shown.

Unless otherwise defined in this specification, the scientific and technical terms used here have the same meaning as understood and used by those with ordinary knowledge in the technical field of the case.

The following describes a system and method for providing analytics and intelligent question-answering via an interactive dashboard according to embodiments of the present invention.

Figure 1:
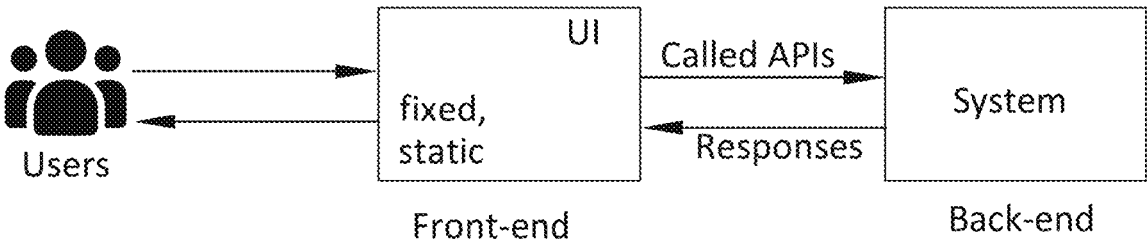
FIG. 1 is a perspective view of prior art.
Figure 2:
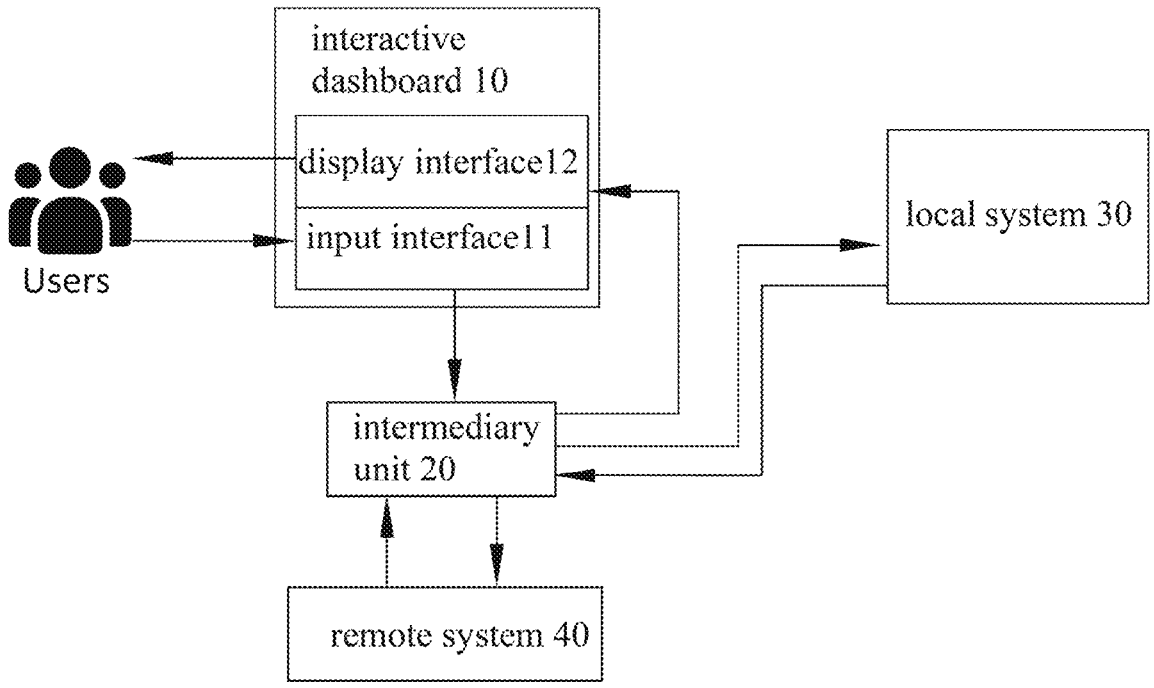
FIGS. 2-3 are perspective views of a system for providing analytics and intelligent question-answering via an interactive dashboard according to a first preferred embodiment of the present invention.
Figure 3:
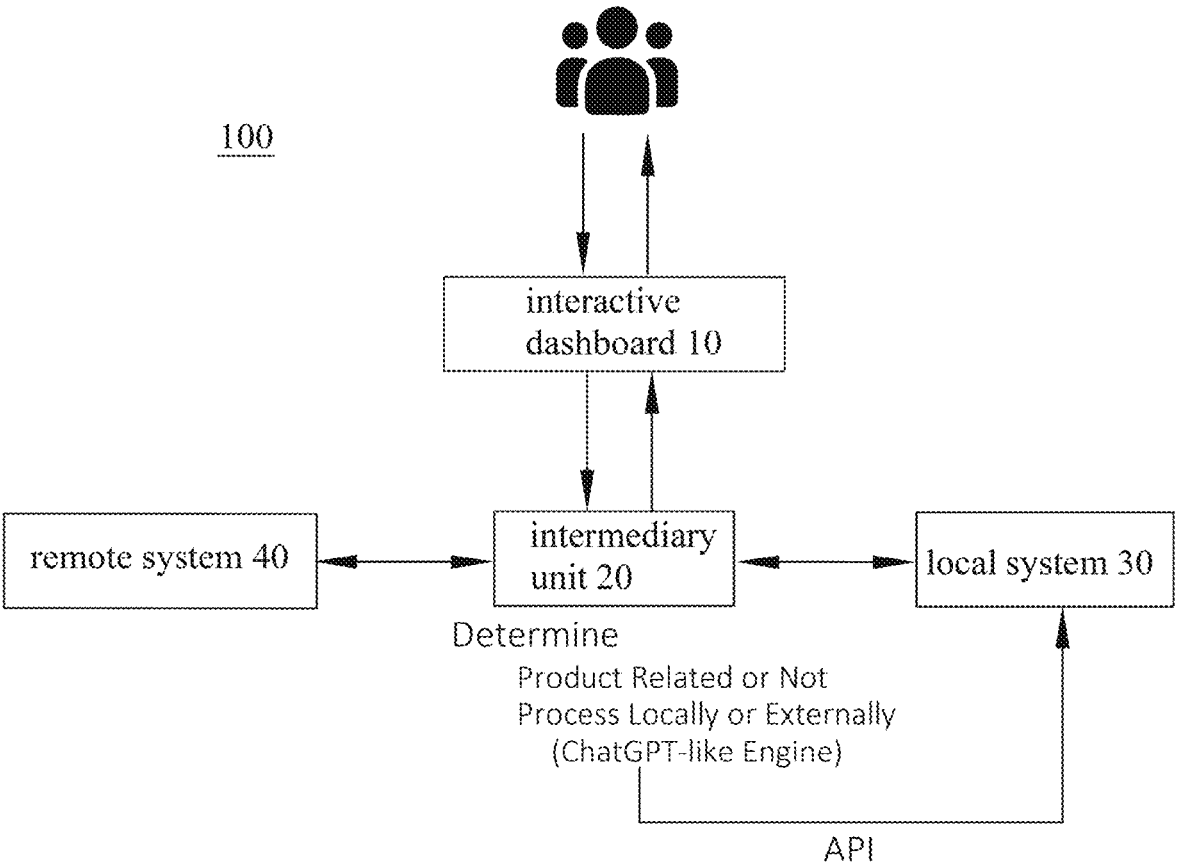
Figure 4:
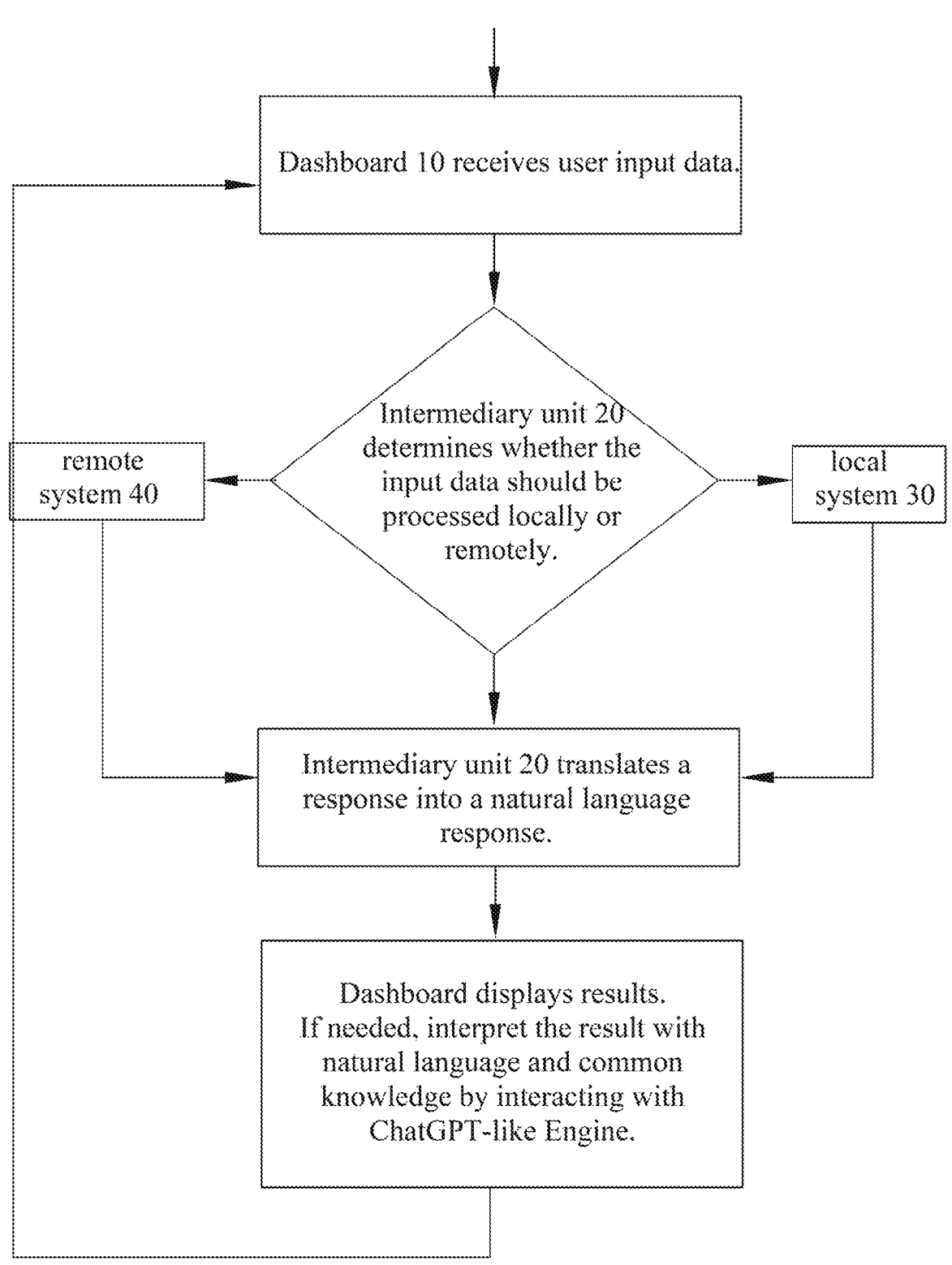
FIG. 4 is a perspective view of a method for providing analytics and intelligent question-answering via an interactive dashboard according to the above first preferred embodiment of the present invention.

FIGS. 2-4 are perspective views of a method and a system for providing analytics and intelligent question-answering via an interactive dashboard according to a first preferred embodiment of the present invention, wherein the method and the system enable two-way communication between a user and a dashboard. The two-way communication enhances the functionality and usability of the dashboard. Further, the present invention allows the user to perform planning, operation automation, optimization, resource orchestration, and debugging more interactively and efficiently. The present invention discloses a system 100 that provides analytics and intelligent question-answering to users via an interactive dashboard. The system 100 includes an interactive dashboard 10, an intermediary unit 20, a local system 30 and a remote system 40. The intermediary unit 20 is connected to the interactive dashboard 10, the local system 30 and the remote system 40, respectively, such that the system 100 utilizes natural language processing to understand user input and generates an interactive and immediate revision to dashboards for users to perform planning, operation automation, optimization, resource orchestration, and debugging.

Preferably, the interactive dashboard 10 includes an input interface 11 and a display interface 12, wherein the input interface 11 of the interactive dashboard 10 is connected to the intermediary unit 20 for providing user input data to the intermediary unit 20, wherein the display interface 12 of the interactive dashboard 10 is connected to the intermediary unit 20 for revising the display interface 12 based on the user input data, wherein the intermediary unit 20 receives and processes the user input data to form a response, and determines whether the response should be processed by the remote system 40 or the local system 30 depending on which is able to translate the response into a natural language response. Once the natural language response is sent back to the intermediary unit 20, the intermediary unit 20 then modifies the interactive dashboard 10 or generates a revised interactive dashboard dynamically to present the natural language response to the user in response to the user input data/inquiry. It is worth mentioning that the user input data is also allowed to be in a form of natural language, that is, the system allows receiving the natural language directly through the input interface 11 of the interactive dashboard 10, and then converting the natural language data into the natural language response through the local system 30 or the remote system 40.

It is worth mentioning that the intermediary unit 20 further features the ChatGPT-like LLM AI-based technology, enabling the system to understand natural language input and respond to updated information and insights to users through interactive and immediate revisions to dashboards.

Preferably, the remote system 40 is implemented as a ChatGPT-like LLM AI-based external engine. The interactive dashboard 10 can also be regarded as a user interface.

In addition, the present invention also provides the method for providing analytics and intelligent question-answering via an interactive dashboard, which includes the following steps: receiving user input data via the interactive dashboard 10; identifying user intent from the user input data and forming a response; translating the response from the local system 30 or remote system 40 into a natural language response; and generating a revised interactive dashboard based on the user intent dynamically according to the response.

The method further includes a step of: repeating the above steps until the user or the user intent is satisfied.

The method further includes a step of: interpreting the result with natural language and common knowledge by interacting with ChatGPT-like LLM AI-based application.

Further, the method further includes the steps of: receiving and processing the user input data via the intermediary unit 20, and identifying user intent from the user input data via the intermediary unit 20, and then forming the response via the intermediary unit 20.

Figure 5:
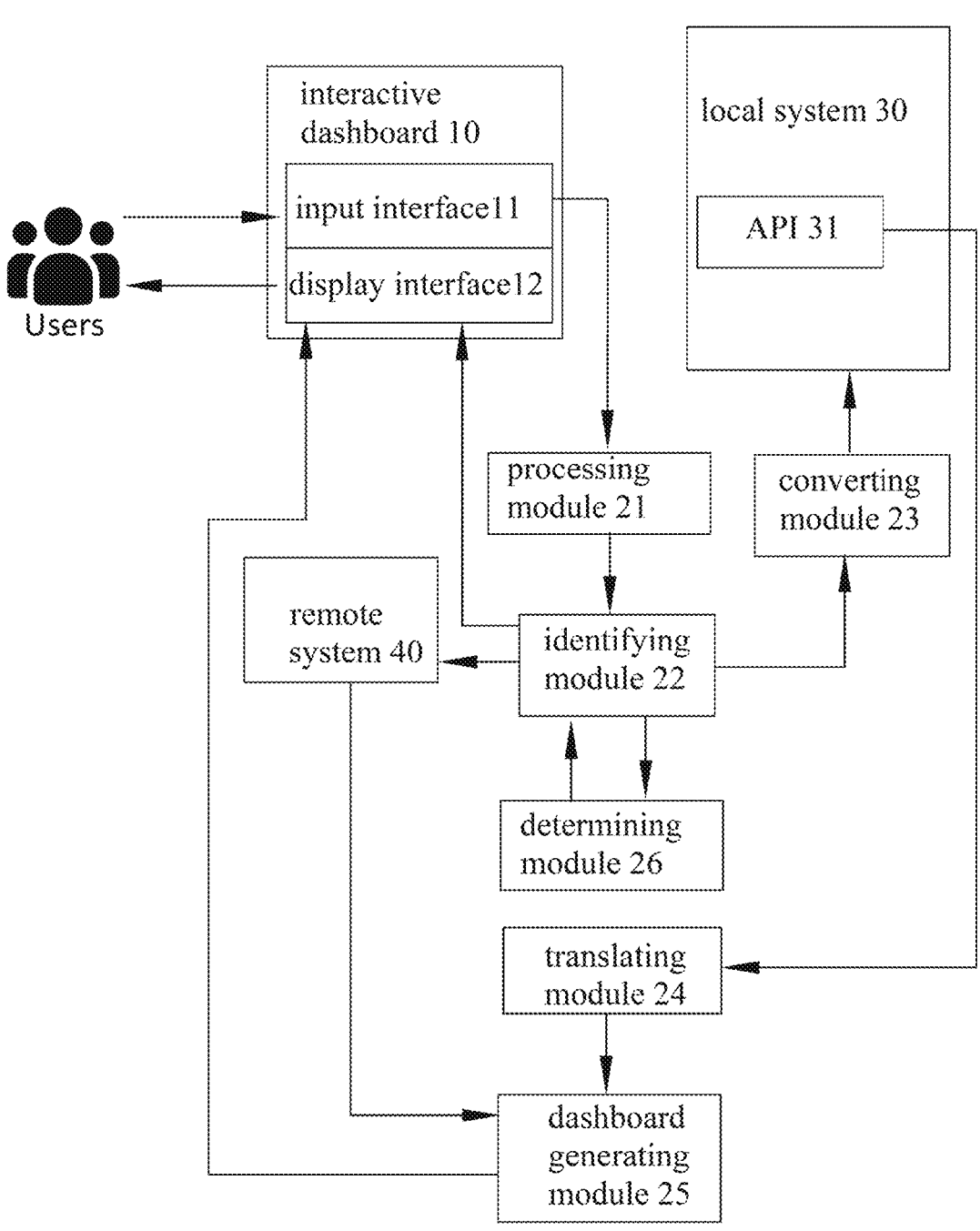
FIGS. 5-6 are perspective views of a system for providing analytics and intelligent question-answering via an interactive dashboard according to a second preferred embodiment of the present invention according to the present invention.
Figure 6:
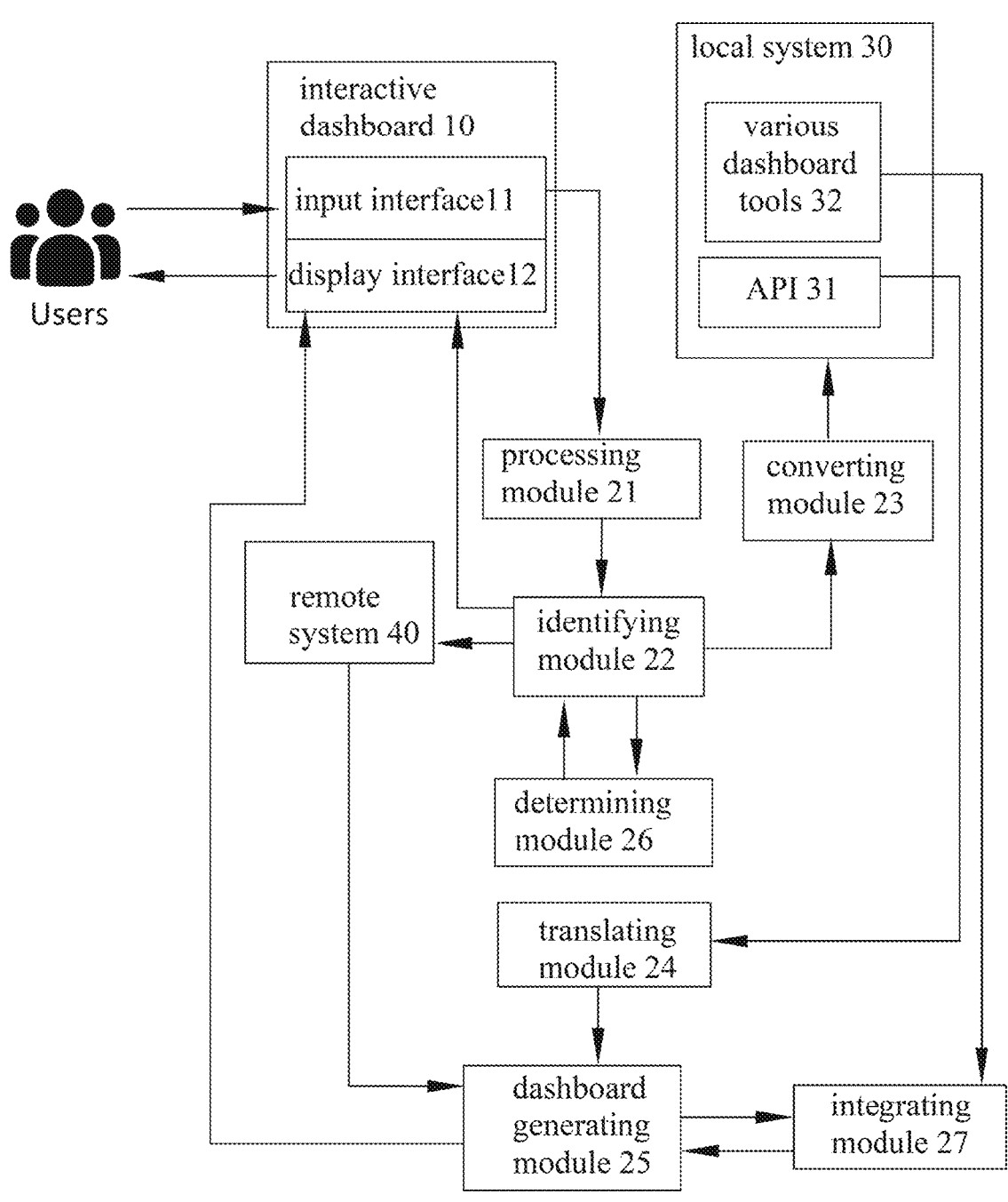

FIGS. 5-7 illustrate a method and a system for providing analytics and intelligent question-answering via an interactive dashboard according to a second preferred embodiment of the present invention that employ ChatGPT-like LLM AI-based technology to enable two-way communication between a user and a dashboard.

Referring to FIG. 5, the system 100 includes an interactive dashboard for receiving user input data, a processing module 21, connected to the interactive dashboard 10, for processing the user input data, an identifying module 22, connected to the processing module 21, for identifying user intent from the user input data, a converting module 23 connected to the identifying module 22 and a local system 30 for converting the user intent into an application programming interface (API) 31 of the local system 30 for the local system 30 to proceed, a translating module 24 connected to the local system 30 for translating a response of the API of the local system 30 into a natural language response, and a dashboard generating module 25 connected to the translating module 24 and the interactive dashboard 10 for generating a revised interactive dashboard based on the user intent dynamically according to the response of the API. It is worth mentioning that the natural language response is generated by an artificial intelligence (AI) large language model (LLM).

In addition, system 100 further includes a determining module 26 connected to the identifying module 22, for determining whether the user input data should be processed by the local system 30 or a remote system 40. Preferably, the remote system 40 is implemented as a ChatGPT-like LLM AI-based external engine. Further, the identifying module 22 is connected to the local system 30 and the remote system 40, respectively. The dashboard generating module 25 is connected to the remote system 40, such that when the remote system 40 forms the natural language response to the user's intention, the interactive dashboard 10 is allowed to be modified or generated by the dashboard generating module 25.

It is worth mentioning that the user is allowed to use the interactive dashboard 10 to continuously enter different user input data to obtain a dynamically revised interactive dashboard.

Referring to FIG. 6, the system further includes an integrating module 27 connected to the dashboard generating module 25 and various dashboard tools 32 of the local system 30 for integrating the various dashboard tools and seamlessly integrating current workflows.

In addition, the interactive dashboard 10 further includes input interface 11 connected to the processing module 21 for providing user input data to the processing module 21. It is worth mentioning that the user input data is received via input interface 11 provided by the local system or integrated with the local system, via a voice-enabled device, or via a chatbot application.

In addition, the interactive dashboard 10 includes a display interface 12 connected to the dashboard generating module 25 for presenting the natural language response via the revised interactive dashboard to the user. Further, the revised interactive dashboard provides information to perform planning, operation automation, optimization, resource orchestration, and debugging.

Referring to FIG. 7, the present invention also provides a method for providing analytics and intelligent question-answering via an interactive dashboard, which includes the following steps: receiving user input data via the interactive dashboard (S01); identifying user intent from the user input data (S02); converting the user intent into an application programming interface (API) of a local system for the local system to proceed (S03); translating a response of the API into a natural language response (S04); generating a revised interactive dashboard based on the user intent dynamically according to the response of the API (S05); and presenting the natural language response via the revised interactive dashboard (S06).

Figure 8:
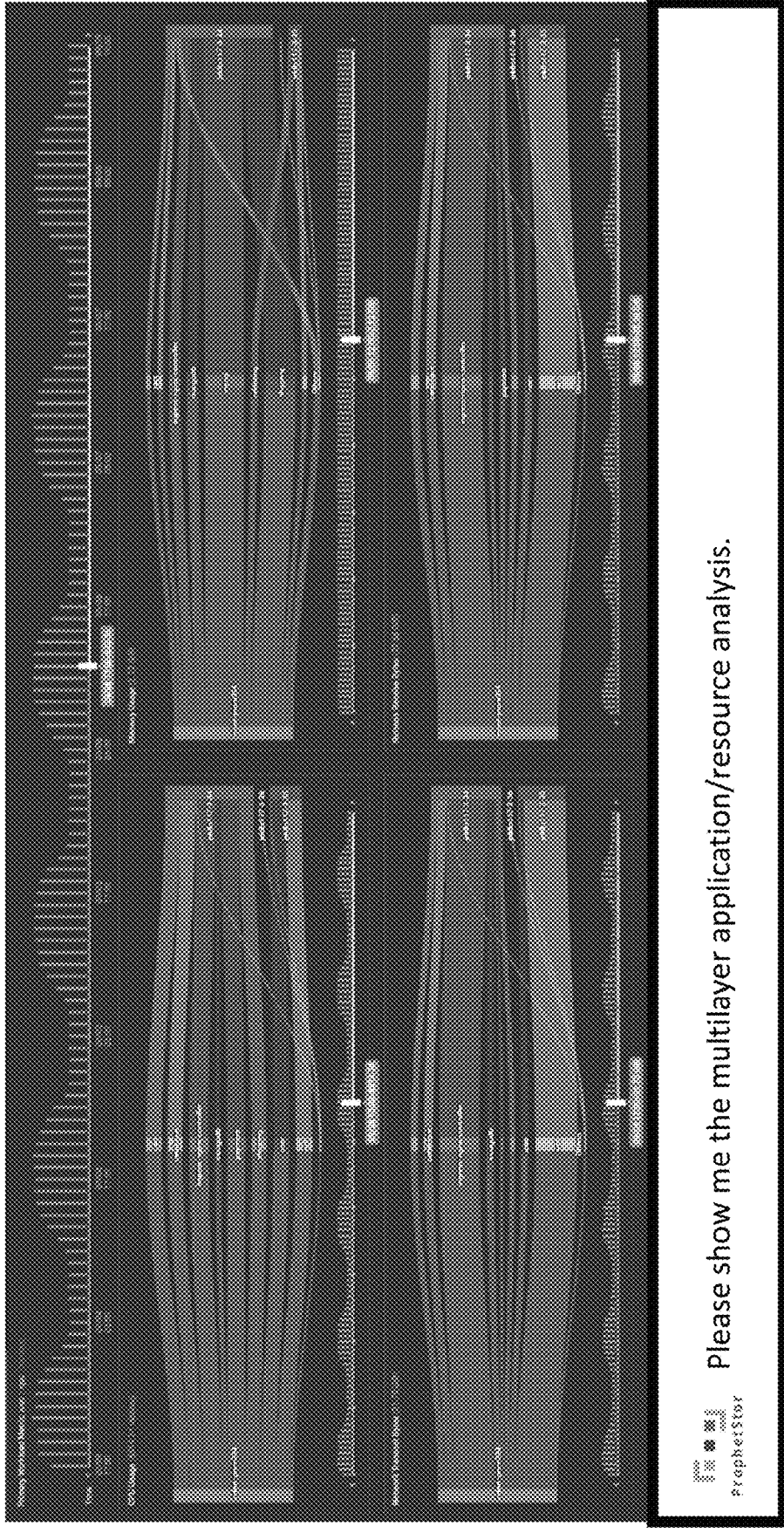
Figure 9:
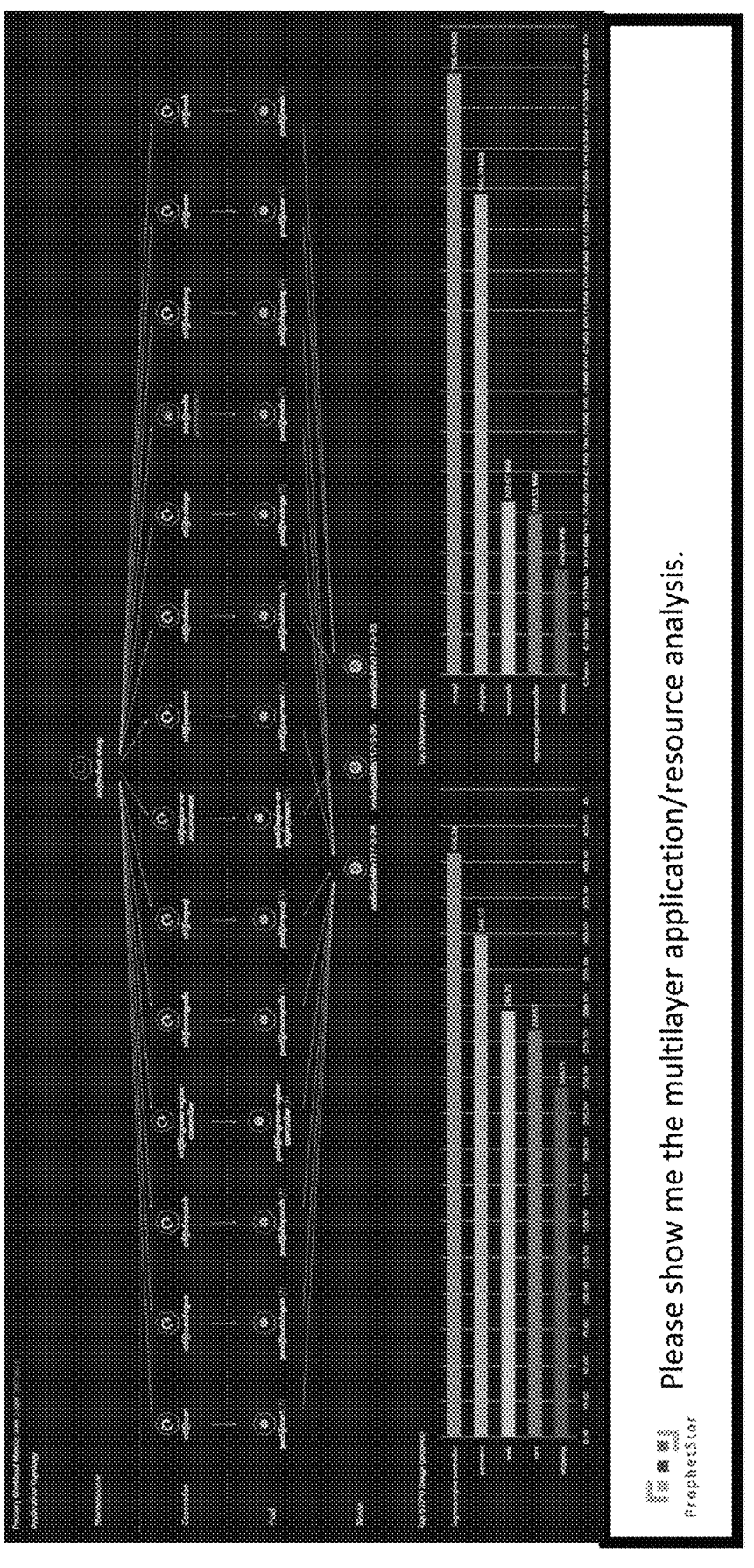
Figure 10:
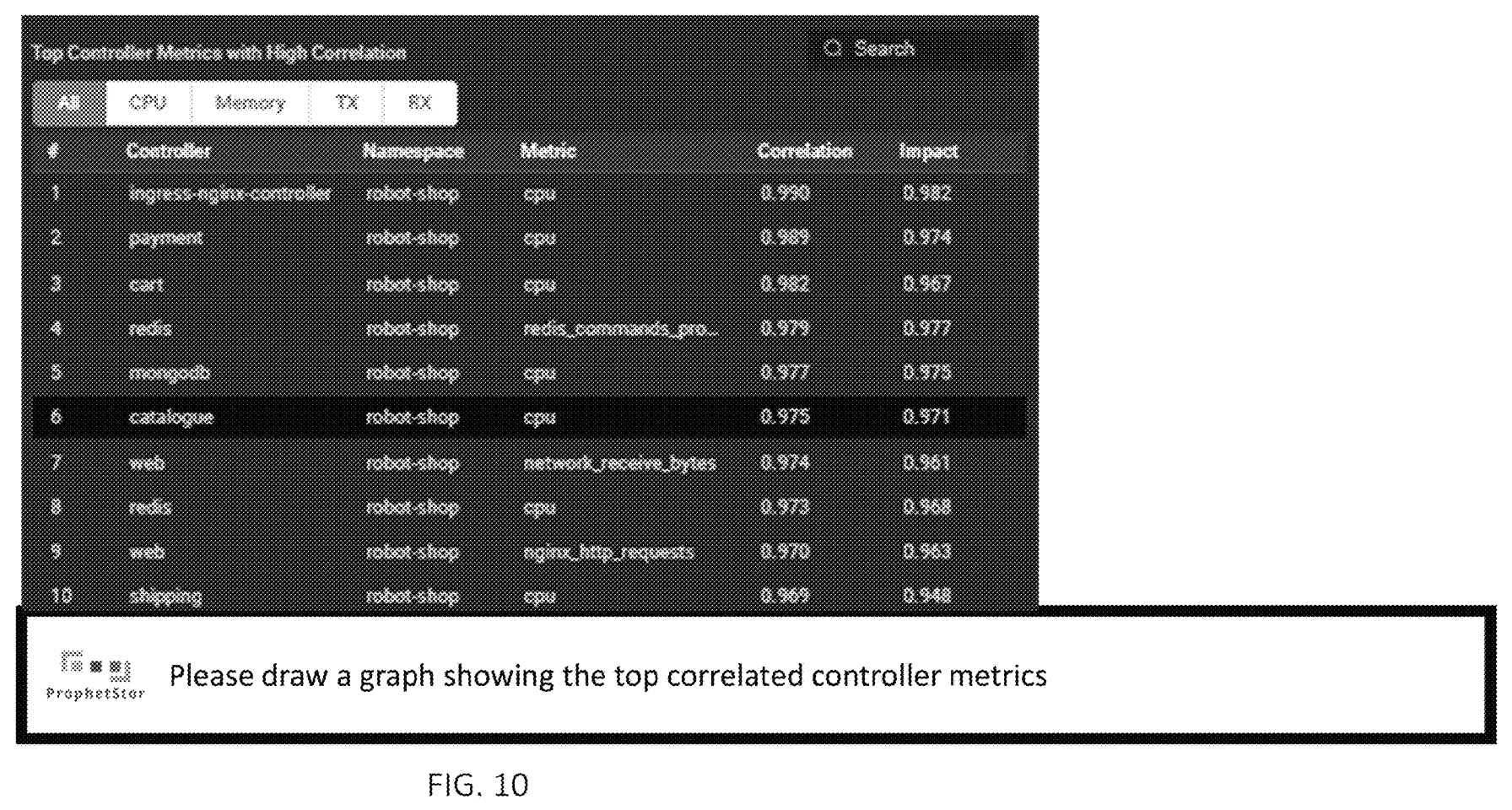

The method further includes a step of: repeating the steps until the user intent is satisfied. In other words, the above steps are allowed to be repeated until the user or the user intent is satisfied. The user is allowed to use the input interface of the dashboard to continually request for further information or services and/or reply to questions generated by the system in order to fulfil the user intent via a dynamically generated revised dashboard. In other words, the dashboard that receives the first user input data may not be the same dashboard that receives the second user input data, and it might be a dashboard that has a totally different user interface which is generated by the dashboard generating module 25, as shown in FIGS. 8-10.

The method further includes a step of: determining whether the user input data should be processed locally or remotely. In other words, the determining module 26 determines whether the user input data should be processed by the local system 30 or a remote system 40. Further, the user intent is identified locally or remotely by a natural language processing application. In other words, the natural language response is translated locally or remotely by the natural language processing application. Understandably, the local system 30 or the remote system 40 are allowed to translate the response into the natural language response by the natural language processing application thereof.

The interactive dashboard 10 is connected to the local system 30 which includes a natural language processing application or interacts with a natural language processing application remote from the local system. In other words, the response of the API is not limited to be translated into a natural language response by the local system 30, it could be translated by the remote system 40 which includes a natural language processing application.

The method may further include a step of: determining whether the user input data is product related. In other words, if the user input data is related to the product, then the flow continues to the next step, and if not, the user might be requested to re-enter or amend the user input data on the interactive dashboard 10.

The method further includes a step of: translating a response of an API from the remote system 40 into a natural language response. Understandably, the remote system 40 which includes a natural language processing application not only allows the user intent to be converted into an API but also translates a response of the API into a natural language response for the local system to further proceed while a natural language processing application is not available by the local system.

In addition, the user input data is received via a natural language interface provided by the local system or integrated with the local system, via a voice-enabled device, or via a chatbot application.

In addition, the revised interactive dashboard provides information to perform planning, operation automation, optimization, resource orchestration, and debugging.

In addition, the natural language response is generated by an artificial intelligence (AI) large language model (LLM).

FIGS. 8-10 illustrate a sample interactive dashboard 10 according to the present invention. The sample interactive dashboard with an interactive chatbot illustrates how the user can ask questions to the Chatbot and receive immediate and intelligent answers. Further, the revised dashboard is displayed in real-time based on the user's questions and intent. In other words, it illustrates how the user can interact with the dashboard using natural language input and how the revised dashboard is presented. FIG. 8 illustrates resource usages for all of the applications on the interactive dashboard 10. Next, a user requests the system to provide a multilayer application/resource analysis. In order to clearly present the analysis result requested by the user, a revised interactive dashboard is then generated by the dashboard generating module 25, as shown in FIG. 9. After the analysis result is presented, the user further requests the system to draw a graph showing the top correlated controller metrics, as shown in FIG. 10. As shown in this example, the present invention provides a system that can dynamically generate a revised interactive dashboard based on the user intent and according to the information/response that is to be presented to the user in response to the user intent.

One skilled in the art will understand that the embodiment of the present invention as shown in the drawings and described above is exemplary only and not intended to be limiting. It will thus be seen that the objects of the present invention have been fully and effectively accomplished. The embodiments have been shown and described for the purposes of illustrating the functional and structural principles of the present invention, and is subject to change without departure from such principles. Therefore, this invention includes all modifications encompassed within the spirit and scope of the following claims.

What is claimed is:

1. A method for providing analytics and intelligent question-answering via an interactive dashboard, comprising the following steps:

receiving user input data via the interactive dashboard;

identifying user intent from the user input data using a Large Language Model (LLM);

converting the user intent into an application programming interface (API) call of a local system for the local system to proceed;

obtaining a response of the API and analyzing the response of the API using the LLM to interpret the result and generate a revised interactive dashboard representing a structured analytic context;

dynamically regenerating, based on the structured analytic context, a revised layout and content of the interactive dashboard including updated data visualizations, query paths, and control elements to facilitate two-way communication and provide real-time interactive analytics for at least one of planning, operation automation, optimization, resource orchestration, or debugging; and presenting the natural language response and the revised layout via the interactive dashboard;

after presenting the natural language response and the revised layout, receiving, via the interactive dashboard, a further user request to generate a graph showing top correlated controller metrics; and in response to the further user request, generating and presenting, via the interactive dashboard, the graph showing the top correlated controller metrics.

2. The method according to claim 1, further comprising a step of: repeating the steps until the user intent is satisfied through dynamic updates to the interactive dashboard and the natural language responses provided by the LLM.

3. The method according to claim 1, further comprising a step of: determining whether the user input data should be processed locally or remotely by the LLM or an associated Natural Language Processing (NLP) application.

4. The method according to claim 1, further comprising a step of: determining whether the user input data is product related for processing by the LLM to generate product-specific insights on the interactive dashboard.

5. The method according to claim 1, wherein the user intent is identified locally or remotely by a natural language processing application that includes or interacts with the LLM.

6. The method according to claim 1, wherein the natural language response is translated locally or remotely by a natural language processing application that includes or interacts with the LLM.

7. The method according to claim 1, wherein the interactive dashboard is connected to the local system which includes a natural language processing application with the LLM, or interacts with a natural language processing application with the LLM remote from the local system.

8. The method according to claim 1, wherein the user input data is received via a natural language interface provided by the local system or integrated with the local system, via a voice-enabled device, or via a chatbot application that is enhanced by the LLM.

9. The method according to claim 1, wherein the revised interactive dashboard provides information to perform planning, operation automation, optimization, resource orchestration, and debugging by dynamically presenting relevant data and insights.

10. The method according to claim 1, wherein the natural language response is generated by an artificial intelligence (AI) large language model (LLM).

11. A system for providing analytics and intelligent question-answering via an interactive dashboard, comprising:

a processing module, configured to process user input data via the interactive dashboard;

an identifying module, configured to identify user intent from the user input data using a Large Language Model (LLM);

a translating module, configured to convert the user intent into an application programming interface (API) call of a local system for the local system to proceed, obtain a response of the API and analyze the response of the API using the LLM to interpret the result and generate a revised interactive dashboard representing a structured analytic context;

a dashboard generating module, configured to dynamically regenerate, based on the structured analytic context, a revised layout and content of the interactive dashboard including updated data visualizations, query paths, and control elements to facilitate two-way communication and provide real-time interactive analytics for at least one of planning, operation automation, optimization, resource orchestration, or debugging; and a user interface connected to the dashboard generating module, configured to present the natural language response and the revised layout via the interactive dashboard, wherein, after the natural language response and the revised layout are presented, the user interface is further configured to receive, via the interactive dashboard, a further user request to generate a graph showing top correlated controller metrics, and the dashboard generating module is further configured to generate and present, via the interactive dashboard, the graph showing the top correlated controller metrics in response to the further user request.

12. The system according to claim 11, further comprising a converting module, configured to convert the user intent into an application programming interface (API) of the local system for the local system to proceed.

13. The system according to claim 11, further comprising a determining module, configured to determine whether the user input data should be processed locally or remotely by a natural language processing application that includes or interacts with the LLM.

14. The system according to claim 11, wherein the identifying module is remotely connected to the local system.

15. The system according to claim 11, wherein the translating module is a natural language processing application with the LLM which is locally or remotely connected to the local system.

16. The system according to claim 11, wherein the user input data is received via a natural language interface provided by the local system or integrated with the local system, via a voice-enabled device, or via a chatbot application that is enhanced by the LLM.

17. The system according to claim 11, wherein the revised interactive dashboard provides information to perform planning, operation automation, optimization, resource orchestration, and debugging by dynamically presenting relevant data and insights.

18. The system according to claim 11, wherein the natural language response is generated by an artificial intelligence (AI) large language model (LLM).

\* \* \* \* \*